United States Patent [19]

O'Boyle et al.

[11] 4,242,425
[45] Dec. 30, 1980

[54] NOVEL LITHIUM HALIDE BATTERY STRUCTURE

[75] Inventors: Matthew O'Boyle, Timonium; Bernard Icore, Randallstown, both of Md.; Marilyn J. Harney, Painesville, Ohio

[73] Assignee: Catalyst Research Corporation, Baltimore, Md.

[21] Appl. No.: 123,381

[22] Filed: Feb. 21, 1980

[51] Int. Cl.³ .................................. H01M 2/26
[52] U.S. Cl. .................................. 429/181; 429/191
[58] Field of Search ............... 429/181, 191, 199, 218, 429/178

[56] References Cited

U.S. PATENT DOCUMENTS

| | | | |
|---|---|---|---|
| 3,723,183 | 3/1973 | Greatbatch | 429/199 |
| 3,874,929 | 4/1975 | Greatbatch | 429/218 |
| 4,049,890 | 9/1977 | Schneider | 429/181 |
| 4,072,803 | 2/1978 | Schneider | 429/181 |
| 4,166,158 | 8/1979 | Mead et al. | 429/181 |

Primary Examiner—Donald L. Walton
Attorney, Agent, or Firm—Reed, Smith, Shaw & McClay

[57] ABSTRACT

The present invention relates to a lithium halide battery structure comprising an outer metal envelope and top portion which is hermetically sealed to the envelope. The top portion includes an insulator conforming to and positioned thereon to the base configuration of the top portion and a support means having a base configuration substantially the same as the insulator. The support means also includes a flange depending from the support base and a pair of spaced apart post holders integral with said flange. First and second posts are positioned in the post holders with a metal anode collector screen positioned between and attached to said posts. The first post extends through the support means, insulator and top portion to define the anode terminal. The second post terminates in the associated post holder. A first and second pair of lithium anodes are pressure bonded together to sandwich therebetween the support means and anode collector screen. First and second depolarizer pellets are positioned between and in coextensive contact with the first and second anodes and the inner surface of the envelope.

3 Claims, 2 Drawing Figures

NOVEL LITHIUM HALIDE BATTERY STRUCTURE

FIELD OF THE INVENTION

The invention relates to lithium halide batteries and, in particular, to lithium halide batteries adapted for use in cardiac pacer devices.

BACKGROUND OF THE INVENTION

The lithium halide battery has become relatively well known to those skilled in the art, U.S. Pat. No. 3,660,163. These batteries have also been accepted for use in cardiac pacers and other types of implantable devices, see generally U.S. Pat. Nos. 3,723,183, 3,895,962, 3,874,929, 3,981,744, 4,010,043 and 4,072,803. Each of the aforementioned patents describes a lithium halide battery adapted for use in cardiac pacers.

Typically, the depolarizer comprises a charge transfer complex and a halogen such as iodide. A problem that exists in designing such batteries is the prevention of iodine leakage. Charge transfer complex migration can cause internal short circuiting of the battery or, if iodine flows externally of the cell, the cardiac pacer can be destroyed. In U.S. Pat. No. 3,874,929, for example, a lithium iodide battery is disclosed in which the anode current collector is positioned between a pair of lithium anode members and is connected to an anode conductor. Leakage is prevented by a ferrule extending the length of the conductor to shield it from the cathode or depolarizer material. The protective ferrule includes a halar sheathing about the conductor; a second layer of halar around the sheath; and an outer metal portion enveloping the second layer.

Another method of avoiding leakage is disclosed in U.S. Pat. No. 4,072,802 wherein the cathode and anode leads are embedded within the side walls of an anode depolarizer container. U.S. Pat. No. 3,981,744 shows yet another method utilizing inverted casings and a hermetically sealed outer metal container.

Each of the described devices have purported advantages. However, each of the known batteries is costly to assemble because of design complexities. Accordingly, it is an object of the present invention to provide a battery having a lower inherent cost because of greater design simplicity and fewer parts. It is a further advantage of the invention to provide a battery having a high relative energy density and improved current capacity. Additionally, it is an object of the invention to provide a battery having smaller physical dimensions as well as a smaller cardiac pulse generation without loss of operating life.

SUMMARY OF THE INVENTION

Generally, the present invention provides a battery structure having an outer metal envelope and top portion hermetically bonded to the envelope. An insulator is normally provided in abuttment with the underside base of the top portion. Adjacent to the insulator is support means preferably molded from Halar or other fluorocarbon material. The support includes a flange member depending from the center of base and extending substantially the length of support. The support means also includes a pair of spaced apart post supports depending from the base. One of the post supports includes an opening extending therethrough which is adapted to aligningly communicate with aligned openings in the top portion and, when provided, the insulator. The other post includes a hole of similar diameter which extends only a portion of the length of the post support.

A pair of posts, each of a different length, are positioned in said post supports such that the longest post is positioned through the post support, insulator and top portion to define the anode terminal of the battery. The other post fits within the hole of the other post support. Both posts are of a diameter which is slightly greater than the opening in the post supports so as to tightly engage the side walls of the respective opening and hole to prevent any iodine depolarizer leakage. Further, both posts are positioned to extend beyond the ends of their associated post supports. Electrically connected to and extending between portions of the posts is an anode current collector, preferably comprising an expanded metal screen.

A pair of lithium anode members are pressed together to sandwich therebetween the anode current collector and flange of the support means. A pair of depolarizer pellets, each pressed to the shape of one-half of the anode assembly and the associated inner contour of the envelope, are positioned in contact and between the anodes and inner surface of the envelope.

Positioned adjacent the periphery of the opening in the top portion through which anode post extends is a concentric flange having a ceramic seal interposed between the flange and anode post to electrically insulate the anode post from the top portion. A cathode terminal may be optionally mounted to the top portion by welding a terminal pin thereto. It is preferable that the envelope include an outer flange to accept the peripheral edges of the insulator and support means and to which the top portion is hermetically welded or bonded.

A complete description of the best mode of the invention presently contemplated is set forth in detail below, the description of which is to be taken in connection with the accompanying drawings and tables which form a part of the description.

DESCRIPTION OF THE INVENTION

Figure 1:
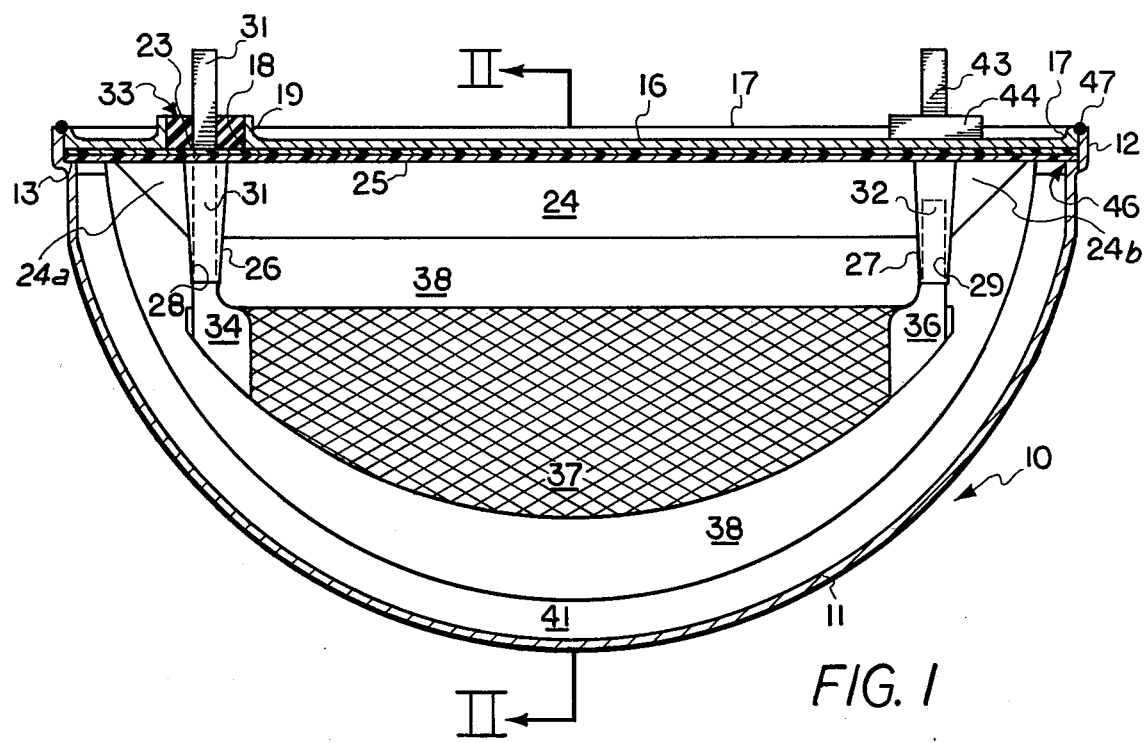
FIG. 1 is an elevation in partial section taken along line I—I of FIG. 2.
Figure 2:
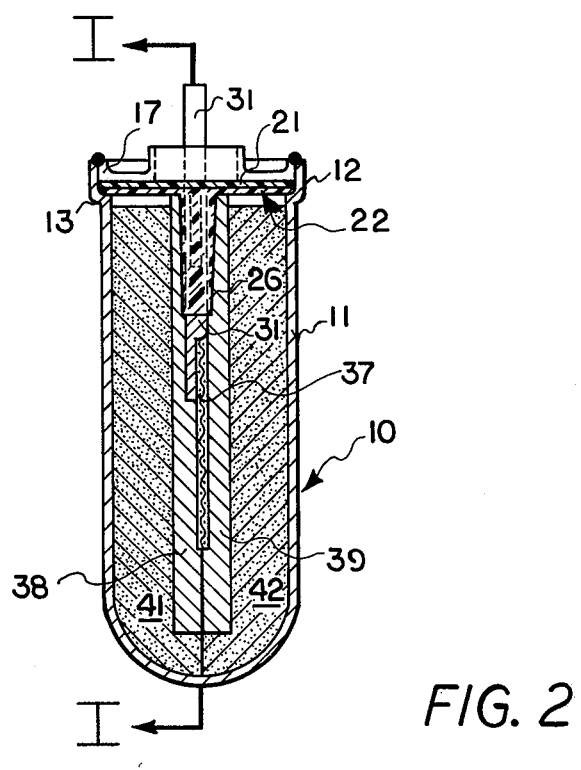
FIG. 2 is a sectional elevation taken along line II—II of FIG. 1.

Referring to the drawings, battery 10 comprises an outer envelope 11, preferably made of nickel or stainless steel having peripheral flange 12 that extends slightly beyond the body of envelope 11. The intersection of flange 12 and envelope 11 forms a seat 13 that extends around the periphery of the envelope. Envelope 11 has a profile in the form of a semicircle as shown in FIG. 1 to form a battery which is physically smaller than many prior art batteries used in cardiac pacers of equivalent capacity.

A top portion 16 is adapted to fit within the perimeter of flange 13 and itself includes a small peripheral flange 17 which is preferably provided to facilate welding the top to the envelope. Top portion 16 also includes opening 18 having a flange portion 19 surrounding the perimeter of the opening. In practice, it is desirable to form flanges 17 and 19 at the same time, although this is not necessary.

Battery 10 includes insulator 21 and support means 22. Insulator 21 is interposed between top portion 16 and support means 22 and is preferably made from a thin layer of Kapton or MICA. Insulator 21 is provided with an opening 23 which is adapted to align with opening 18. Insulator 21 is of the same shape as and coextensive with top portion 16, and is used to insulate support means 22 from the heat generated when top portion 16 is welded to envelope 11. It is clear, however, that the insulator may be omitted where other methods of fastening the top to the envelope are used which do not generate high temperatures.

Support means 22 includes base 25 and depending flange 24 having end portions 24a and 24b. Support means 22 is preferably injection molded from a fluroplastic such as Halar or TEFZIL. Support means 22 is approximately 0.030 inches in thickness and is coextensive with the perimeter of top portion 16 and insulator 21. The perimeter of support means 22 is positioned on seat 13 with its edge abutting flange 12 to form a seal at seat 13 when top 16 is welded in place.

Adjacent to each end portion 24a and 24b are depending post supports 26 and 27, respectively. Post support 26 is provided with opening 28 which extends the length of post support 26 and is adapted to register with openings 18 and 23 of top portion 16 and insulator 21, respectively. Post support 27 includes a support recess 29 having a diameter substantially the same as opening 28. Support posts 26 and 27 extend beyond the end of flange 24 and are adapted to engagingly support posts 31 and 32, respectively.

Support posts 31 and 32 preferably have a diameter slightly greater than associated openings 28 and 29 for tight engagement. Support post 31 is longer than post 32 and is positioned within and through opening 28 so as to extend beyond flange 19 surrounding opening 18 in the top portion 16. Post 31 defines the anode terminal of battery 10. Post 31 is positioned in opening 18 and electrically insulated from flange 19 by means of ceramic seal 33. Ceramic seal 33 also provides, in cooperation with the top weld, hermetic sealing of the battery. Post 32 is somewhat shorter than post 31 and is engagingly located in opening 29.

Supports 31 and 32 include extended surfaces 34 and 36, respectively, located adjacent to the ends of the associated post support. Surfaces 34 and 36 are preferably flat and adapted to support therebetween anode current collector 37 which preferably is formed from expanded nickel or nickel alloy screen. Anode collector 37 preferably includes a copper plating and is resistance welded to the respective flat surfaces 34 and 35. As shown in FIG. 1, current collector 37 has a profile configuration which is substantially the same as the profile of envelope 11.

A pair of lithium anodes 38 and 39 are bonded together so as to sandwich therebetween support means 22 and anode current collector 37. Each of the anodes has a profile configuration which is substantially semicircular and adapted to completely enclose the support means and current collector therebetween. Bonding is preferably pressure bonding and is adapted to provide a complete seal of posts 31 and 32 and their associated post supports 26 and 27 to effectively prevent the increase of depolarize-cathode material.

A pair of depolarizer pellets 41 and 42 are molded to the contour of the inner surface of envelope 11 and the anodes 38 and 39 so as to be in contact with and substantially coextensive with the inner surface of envelope 11 and anodes 38 and 39. Depolarizers 41 and 42 are preferably made from a pelletized mixture of iodine, an organic polymer of either poly-2-vinylpyridine or poly-2-vinylquinoline and a charge transfer complex consisting of the selected organic polymer and iodine wherein the mixture contain from 3 to 30 parts of iodine to each part of total organic as described more fully in U.S. Pat. No. 4,148,975 (incorporated herein by reference) or a polyquaternary charge transfer as described in U.S. Pat. Application Ser. No. 073,188, filed Sept. 9, 1979.

The battery envelope 11 is the cathode or positive terminal; however, for a number of devices, a positive post terminal is necessary. As shown in FIG. 1, such a terminal is provided by welding cathode post 43 having a metal base 44 to the top portion 16. The top portion 16 is welded at flange 17 to flange 12 of envelope 11 to provide a hermetic weld seal 46 around the perimeter of the respective flanges. It is desirable when placing weld 47 to have top portion 16 in compression against support means 22. Insulator 21 will provide sufficient insulation from the heat caused by resistance welding to protect support means 22 and compression will assure a seal is created at seat 13 to prevent halogen migration between support means 22 and insulator 21 or insulator 21 and top 16 to cause a short circuit with anode post 31.

Table I below is median performance date of batteries prepared in accordance with the present invention.

TABLE

| No. of batteries | Load | Voltage (millivolts) | Impedance (ohms) | capacity expended (milliampere-hrs) | resisturity (ohm/milliampere-hrs) |
|---|---|---|---|---|---|
| 9 | 20k | 2348 | 2775 | 996 | 2.8 |
| 14 | 50k | 2894 | 1255 | 422 | 3.0 |
| 11 | 100k | 2753 | 901 | 213 | 4.2 |

It has been found that batteries of the present invention exhibit much less polarization effects than comparable batteries of the prior art using similar electrochemical systems.

While a presently preferred embodiment of the invention has been shown and described in particularity, it may be otherwise embodied within the scope of the appended claims.

What is claimed is:

1. A lithium halide battery comprising:
   a. metal envelope having a top portion with an opening therethrough hermetically bonded thereto, said envelope including a peripheral flange forming a seat around the perimeter of the envelope;
   b. a support means having its peripheral edge positioned on said seat and including a depending flange, said support means including first and second spaced apart post supports integrally formed with said flange, said first post support having an opening extending therethrough for alignment and communication with said opening in the top portion;
   c. first and second posts engagingly positioned in the respective first and second post supports, said first post extending through said openings in said first post support and top portion, each of said posts extending beyond their respective post support;
   d. an anode current collector connected to and extending between the first and second posts;
   e. a pair of lithium anodes positioned on opposite sides of said support means flange and current collector and bonded together so as to sandwich therebetween said support means flange, posts and current collector;

f. a pair of depolarizer pellets molded to fit between said lithium anode and envelope and positioned in coextensive contact therewith; and g. means for sealingly positioning said first post within the opening and electrically insulating said first post from the top portion.

2. A battery as set forth in claim 1 including:

h. an insulator positioned between and in contact with said top portion and support means, said insulator including an opening in alignment with the openings in said top portion and support means.

3. A battery as set forth in claims 1 or 2 wherein said support means is made from an electrically nonconductive material compatible with said depolarizer pellets.

* * * * *